United States Patent [19]

Matsko et al.

[11] 4,331,996
[45] May 25, 1982

[54] TIME DELAYED UNDERVOLTAGE RELAY

[75] Inventors: Joseph J. Matsko, Beaver; Raymond O. D. Whitt; Roy W. Lange, both of Brighton Township, Beaver County, all of Pa.

[73] Assignee: Westinghouse Electric Corp., Pittsburgh, Pa.

[21] Appl. No.: 68,774

[22] Filed: Aug. 22, 1979

[51] Int. Cl.$^3$ .............................................. H02H 3/24
[52] U.S. Cl. ....................................... 361/92; 361/187
[58] Field of Search ........................... 361/90, 92, 187; 340/663; 307/130, 358

[56] References Cited

U.S. PATENT DOCUMENTS

| | | | |
|---|---|---|---|
| 3,940,664 | 2/1976 | Matsko | 361/92 |
| 4,099,068 | 7/1978 | Kobayashi et al. | 361/92 X |
| 4,137,557 | 1/1979 | Ciarniello et al. | 361/92 |

Primary Examiner—Harry E. Moose, Jr.
Attorney, Agent, or Firm—M. J. Moran

[57] ABSTRACT

This concerns an undervoltage relay device for a circuit breaker system with a time delay feature. Two lines of the electrical system to be protected are monitored by a transformer. The output of which is rectified and provided to a capacitive element which, among other things, filters the signal. The capacitive element may comprise a single capacitor or combination of capacitors. The combination chosen is the function of the amount of time delay desired. If the voltage across the monitor lines drops below a predetermined value, the voltage level across the capacitive element begins to drop accordingly. This decreasing voltage signal is provided by way of a voltage divider to one input terminal of a comparator. The other input terminal of which is maintained at a reference voltage. When the signal voltage drops below the reference voltage, the comparator shift state thus causing an undervoltage relay coil to be deenergized. The armature of the undervoltage relay coil is spring biased so that upon deenergization the armature moves under the influence of the bias thus tripping the circuit breaker. The capacitive element additionally supplies the voltage for the relay coil. The discharge path for the capacitive element is deliberately chosen so that sufficient voltage will be supplied to the relay coil to keep it energized during the time out period of the time delay element, even though the voltage across the lines has dropped to a lower value. The time out is a function of the capacitance of the capacitive element and the resistance of the discharge path. The output of the previously described comparator element is feedback to another comparator element which controls one of the resistive elements of the previously described voltage divider. When the output of the first comparator element changes states, the second comparator element acts in such a way as to change the effect of the resistive element in the voltage divider path thus latching the first comparator into its last obtained state. Another feature is a light emitting diode which is connected in series with the undervoltage relay coil and which extinquishes when the undervoltage relay coil is deenergized, thus providing a positive indication that an undervoltage relay condition exists. Still another feature includes a memory means which extinquishes when the undervoltage relay condition exists and which remains in a disposition of non-illumination. Even if the undervoltage relay condition disappears to provide an indication to an operator that an undervoltage relay condition had occurred previously.

2 Claims, 1 Drawing Figure

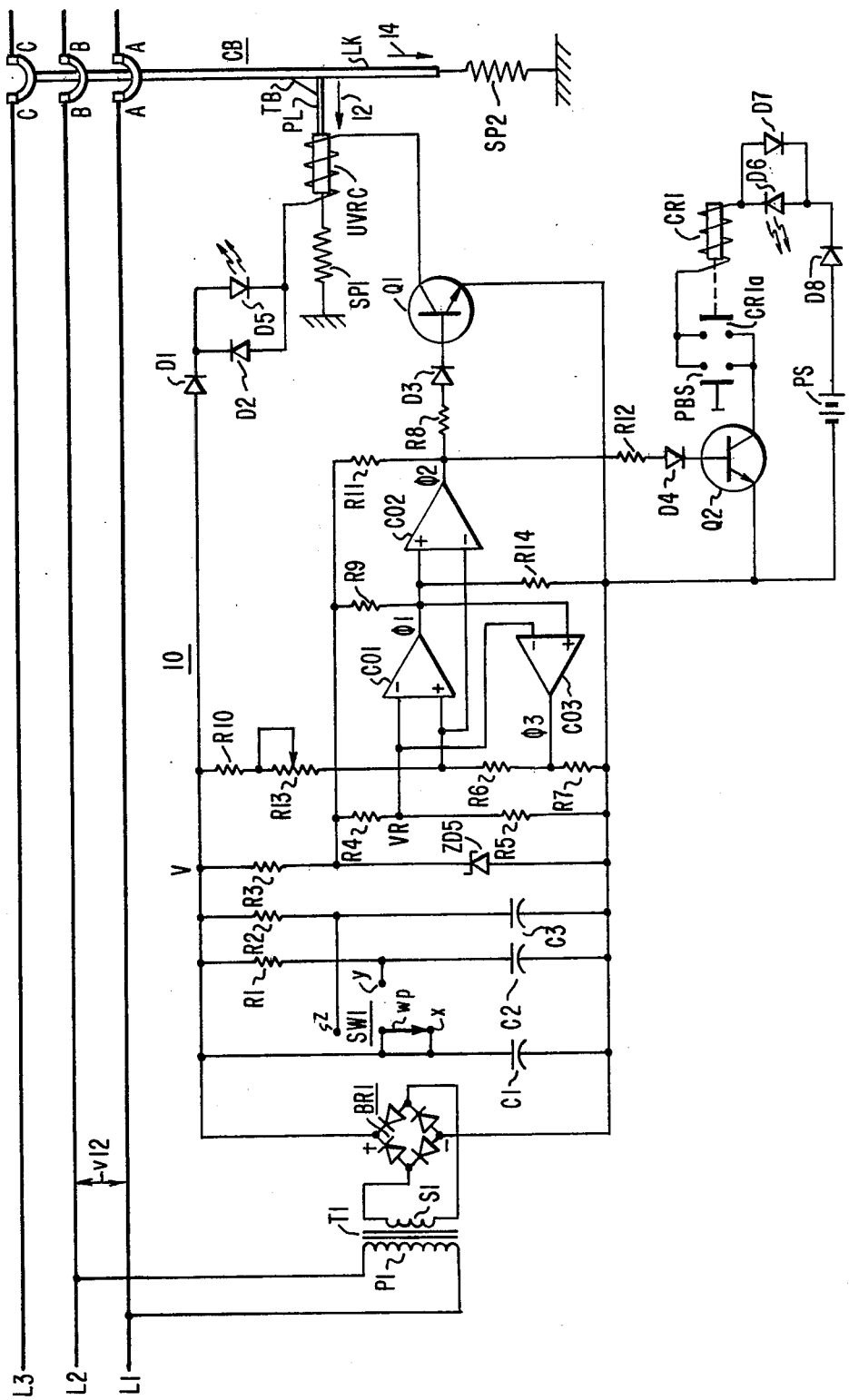

TIME DELAYED UNDERVOLTAGE RELAY

BACKGROUND OF THE INVENTION

The subject matter of this invention relates generally to undervoltage relays and more particularly to an undervoltage relay device in which both time-out and coil energization come from the same capacitive source.

Undervoltage relays for circuit breaker apparatus are well known. An example of such may be found in U.S. Pat. No. 3,590,325, issued Jan. 29, 1971 to J. W. McMillen et al. entitled "Undervoltage Protection and Energy Storage Trip Current". The latter patent is assigned to the assignee of the present invention. It is generally well known that the control systems for circuit breaker apparatus are often powered by the very electrical lines which they protect. It is feasible therefore to expect that under certain operating conditions, the electrical power necessary to trip the circuit breaker may not be present even though it is very desirous to trip the circuit breaker because of the amount of electrical current flowing through the contacts thereof. Such an occasion may occur when the voltage on the electrical lines from which the energization of the control system is derived falls below a certain minimal necessary level. To avoid this, it is well known in the prior art to purposely trip the circuit breaker when the control system voltage falls below the minimum operating value. The latter-mentioned patent shows an example of such a circuit where mechanical relays are utilized. It is desirous to find an undervoltage detecting and tripping system which utilizes static components because of the higher reliability, lower space requirements and power requirements associated therewith. Furthermore, it is desirous to provide a relatively short time delay period between the sensing of the undervoltage condition and the actuation of the tripping operation. This relatively short period, which may be as large as one half of a second, allows the conductors which are protected by the circuit breaker to continue to conduct current and thus serve electrical needs even though the voltage thereacross may momentarily drop below the level at which undervoltage tripping would otherwise be initiated. Consequently, inconsequential voltage transients and momentary voltage drops will be ignored although serious voltage drops of long duration will be accounted for. In the past, time delayed undervoltage devices have been found which utilize a two capacitive element system for operation. One of the capacitive elements stores the energy necessary to complete the energization of the coil once begun and the other capacitive element performs the timing function. It would be desirous if a time delayed undervoltage protective relay system could be found in which a single capacitive element could be used in place of dual capacitive elements. In the context used herein, the term "single capacitive element" does not necessarily mean that the system has only one capacitor. It means that whatever capacitive element or elements are used, they perform the multiple functions of timing out and providing energy for tripping. Consequently, two or three capacitive elements may be connected in series or parallel circuit relationship to form a single capacitive element. An example of the aforementioned dual capacitive element circuits (as opposed to single capacitive elements) is found in U.S. Pat. No. 3,343,036, issued Sept. 19, 1967 to F. L. Steen and entitled, "Static Undervoltage Circuit". Another example is found in U.S. Pat. No. 3,582,716, issued June 1, 1971 to R. O. Traina and entitled, "Apparatus for Providing Time Delay Upon Total Deenergization". In the latter patent, another disadvantage is found in that the signal for beginning initiation of the tripping operation occurs on an increase in voltage across the timing element (here a capacitor) rather than the decrease thereof. It would be therefore further advantageous if the present invention initiated the tripping operation on a decrease in voltage across the timing element rather than an increase in the voltage thereacross. It would be even further advantageous if apparatus could be found for providing a memory indication of a recent undervoltage trip where the undervoltage condition had disappeared after the tripping operation had been completed. It would be even further advantageous if apparatus could be found in which once the tripping operation had begun circuit variable levels (voltage for example) are changed to such an extent that a positive latching operation takes place.

SUMMARY OF THE INVENTION

In accordance with the invention, a single capacitive energy storage voltage sensing means is provided which is interconnected with an electrical system for sensing a voltage level therein. The electrical system is protected by a circuit breaker which opens when the latter-mentioned voltage falls below a predetermined level. In the present invention, a voltage comparator which is utilized to compare voltage signals across a resistive device with a reference value is actuated to consequently energize a controllable switch device to a conducting state. The controllable switch device is interconnected with an undervoltage relay coil which in turn is interconnected with the output terminals of the aforementioned single capacitive energy storage voltage sensing means. The predetermined time delay period is purposely made less than the time it takes to reduce the voltage across the aforementioned terminals after the system voltage has fallen below the predetermined value. This means once the time out has taken place, there is still sufficient voltage left to energize the relay coil.

BRIEF DESCRIPTION OF THE DRAWING

For a better understanding of the invention, reference may be had of the preferred embodiment thereof shown in the accompanying drawing in which a schematic circuit diagram of an undervoltage relay system is shown.

DESCRIPTION OF THE PREFERRED EMBODIMENTS

Referring now to the drawing, a three-phase electrical system comprising electrical conductors L1, L2 and L3 is shown. It is to be understood that the operation of the present invention is not limited to three phase or even alternating current operation. The three phase system shown in the FIGURE is provided merely for the purpose of simplicity of illustration. The three phase electrical system is protected by a circuit breaker CB having three sets of separable main contacts AA, BB and CC which may be open to protect the lines L1, L2 and L3. There is provided an undervoltage detecting system 10 which comprises at the input thereof, a transformer T1 having a primary winding P1 and a secondary winding S1. The primary winding in this embodiment of the invention is shown for purposes of simplicity of illustration as being interconnected with the two lines L1 and L2 across which a voltage v12 is developed. In the event that the voltage v12 falls below a predetermined level which may cause other portions of the circuit breaker system (not shown) to fail to operate in the event of an overload in any of the lines L1, L2, L3 or any combination thereof, the undervoltage system 10 must operate to trip the circuit breaker CB even though no overload current is present on the lines L1, L2 or L3. The secondary winding S1 is interconnected with a full wave bridge rectifier BR1, the output terminals of which have impressed thereacross a variable DC voltage value. The fluctuating DC voltage is filtered by capacitive elements C1, C2, C3 or certain combinations thereof. Capacitive element C1 is interconnected by way of a switch SW1 to the output terminals of bridge BR1. In a like manner, capacitive element C2 is interconnected in series circuit relationship with a current limiting resistive element R1, the entire combination being connected across the output terminals of the bridge BR1. Finally, capacitive element C3 is also interconnected with a resistive element R2, the entire combination being connected across the output of the bridge BR1. The pole wp of the switch WS1 may be interconnected alternately to any of the points x, y or z shown in the FIGURE. When the wiper is interconnected with point x, the capacitive element C1 is not interconnected with any of the other capacitive elements C2 or C3. Capacitive element C2 and C3 though capable of being charged to the entire peak voltage level between the output terminals of the bridge BR1 will not discharge quickly because of the presence of the relatively high resistive values represented by resistors R1 and R2, respectively. The wiper wp may be placed in the disposition associated with point y, in which case, capacitive elements C1 and C2 will be connected in parallel circuit relationship for generating longer time delay period and finally the wiper wp of switch SW1 may be interconnected with point z in which case capacitive elements C1 and C3 are interconnected in parallel circuit relationship for generating an even longer time delay period. The time delay periods associated with points x, y and z may correspond to 0.1 seconds, 0.3 seconds, or 0.5 seconds, respectively. There is therefore at the output of the bridge BR1 a voltage level V which is related to the magnitude of the voltage v12 and to the various combinations of connections of capacitive elements C1, C2 and C3. A resistive element R3 is interconnected with the positive output terminal of the bridge BR1. The other side of resistive element R3 is connected concurrently to the regulating terminal of the Zener diode ZD5, to one side of a resistive element R4, to one side of a resistive element R9, and to one side of a resistive element R11. The other side of the resistive element R4 is connected concurrently to one side of a resistive element R5 and to the negative input terminal of a comparator CO1. The other side of the resistive element R9 is connected to the output terminal of the comparator CO1, to the positive input terminal of a second comparator element CO2, to the positive input terminal of a third comparator element CO3, and to one side of a resistive element R14. A resistive element R10 is connected at one side thereof to the positive output terminal of the bridge BR1. Connected to the other side of the resistive element R10 is one side of a potentiometer element R13, the other side of which is connected to the positive input terminal of previously-mentioned comparator element CO1, to the negative input terminal of the comparator element CO2, and to one side of a resistive element R6. The other side of the resistive element R6 is connected to the output terminal of the comparator CO3, and to one side of a resistive element R7. The negative input terminal of the comparator element CO3 is connected to the junction between the resistive elements R4 and R5 at which a reference voltage VR may exist. The other side of the resistive element R11 is tied concurrently to the output terminal of the comparator element CO2, to one side of a resistive element R8 and to one side of a resistive element R12. The other side of the resistive element R8 is connected to the anode of a diode D3, the cathode of which is connected to the base of a transistor Q1. The collector of the transistor Q1 is connected to an undervoltage relay coil UVRC, the other side of which is connected to the anode of a diode D2 and the cathode of a light-emitting diode D5. The anode of a light emitting diode D5 and the cathode of the diode D2 are concurrently connected to the cathode of a diode D1, the anode of which is connected to the positive output terminal of the bridge BR1. The other side of the resistive element R12 is connected to the anode of a diode D4, the cathode of which is connected to the base of a transistor Q2. The collector of the transistor Q2 is connected concurrently to one side of a set of relay contacts CR1a and one terminal of a pushbutton switch PBS. The other side of the pushbutton switch PBS is connected to the other side of the set of relay contacts CR1a and to one side of a relay coil CR1. The other side of the relay coil CR1 is connected to the cathode of a light emitting diode D6 and to the anode of a diode D7. The cathode of the diode D7 and the anode of the light emitting diode D6 are connected together and to the cathode of a diode D8, the anode of which is connected to the positive terminal of a power supply PS, the negative terminal of the power supply PS is connected to the emitter of the aforementioned capacitor Q2 and to the negative terminal of the bridge BR1. Also connected to the negative terminal of the bridge BR1 are the other sides of the capacitive elements C1, C2, C3, the anode of the Zener diode ZD5, the other sides of the resistive elements R5, R7, R14 and the emitter of the transistor Q1. Normally, when there is no undervoltage condition for the voltage v12, for example, the plunger or movable core PL of the undervoltage relay coil UVRC is forced by the conducting coil UVRC to the fully-extended position shown in the FIGURE such that a tab TB on the linkage LK for the circuit breaker CB is caught thereby thus preventing a spring SB2 from moving the link LK of the circuit breaker CB in the direction 14 which would cause an opening of the contacts AA, BB and CC. However, when the undervoltage relay coil UVRC is deenergized the spring force of the bias spring SP1 causes the plunger PL moves in the direction 12 thus freeing the linkage LK to move in the direction 14 under the influence of the opening spring SB2. This opens the aforementioned contacts AA, BB and CC. This latter event occurs if the voltage v12 falls below a desired predetermined level.

OPERATION

The voltage v12 is reduced by transformer T1, rectified by the bridge BR1 and filtered by the capacitive elements C1, C2 or C3 in appropriate combinations thereof. This produces a relatively stable predetermined DC voltage V between the positive terminal of the bridge BR1 and the negative terminal thereof. The resistive element R3 and the Zener diode ZD5 provides a relatively fixed voltage at the tops of the resistive elements R4, R9 and R11 (as shown in the FIGURE) and thus provides a regulating voltage VR at the negative input terminal of the comparator CO1. Under normal operating circumstances, the voltage divider formed by the resistive elements R10, R13 and R6 (R7 being shorted out by the low output of the comparator CO3) provides a voltage (higher than VR) on the positive input terminal of the comparator CO1 sufficient to maintain the output of that comparator high thus making the positive input to the comparator CO2 high thus making the output thereof high. This provides base drive current for transistor Q1 thus maintaining transistor Q1 in the conductive state thus causing current to flow from the bridge BR1 through the undervoltage relay coil UVRC, through the diode element D1 and through the light emitting diode element D5. The position of plunger PL against the tab TB keeps the linkage LK in place as shown in the FIGURE. Furthermore, the current flowing through the diode D5 causes light to emanate therefrom giving a positive indication that the undervoltage relay coil is working properly and that no undervoltage situation exists. Since the output of the comparator CO1 is high, the value on the positive input terminal of the comparator CO3 will be high relative to the value on the negative input terminal thereof. Therefore the output of the comparator CO3 floats at the voltage value determined by the aforementioned voltage divider. Furthermore, if the output of the comparator CO2 is high, then base drive current is provided for the transistor element Q2 and presuming that the pushbutton PBS has been properly actuated previously, current will flow by way of the power supply PS which may be a 24 volt battery through the diode D8, the light emitting diode D6, the conducting relay coil CR and the latched-in relay coil contacts CR1a back to the negative terminal of the power supply PS.

Diodes D7 and D2 operate to protect the light emitting diodes D5 and D6 in a normal manner. Diode D1 operates to provide energy to the undervoltage relay coil in only one direction. If the voltage v12 drops below a predetermined safe limit or if it drops to zero, the voltage V will begin to drop as the capacitive elements C1 or C2 or C3 or the appropriate combination thereof discharge through the various discharge paths in the circuit 10. The regulating voltage VR will be maintained relatively fixed until the voltage value V drops below the value of the regulating voltage for the Zener diode ZD5. Before this happens, the voltage divider combination including the resistive elements R6, R7, R10 and R13 will cause the voltage at the positive input terminal of the comparator CO1 to drop below that at the negative input terminal (i.e. VR) thus switching the output level of comparator CO1 to zero thus causing the output of the comparator CO2 to drop to zero thus removing the base drive current from the transistor Q1. This will happen after a time delay associated with the predetermined discharge time of the appropriately arranged capacitive elements and resistive elements. Primarily, the capacitive element C1 or C1 combination with C2 or C1 in combination with C3 discharges through the resistive elements R10, R13, R6 and R7, some discharge additionally taking place through resistive element R9 and R14 and resistive element R3, R4 and R5. Discharge also takes place through the undervoltage relay coil URVC and the conducting transistor Q1. The capacitive elements CR, C2 and C3 interconnected in the appropriate combinations as determined by the position of the switch SW1 must be such and is made such that sufficient energy is provided to the undervoltage relay coil URVC to keep it actuated during the time-out or delay period. When the time-out is completed the undervoltage relay coil UVRC is disconnected from the power source BR1 by the turning off of transistor element Q1. It is envisioned that sufficient energy would have been available from the various capacitive elements to maintain the undervoltage relay coil UVRC conductive if the time-out period had not elapsed. As this happens, the circuit breaker CB is tripped in a manner previously described. Furthermore, since no current flows through the light emitting diode D5 at this time, it stops illuminating. Also, the base drive is removed from the transistor Q2 and it stops conducting thus removing current from the light emitting diode D6. Furthermore, since the voltage on the positive terminal of the comparator CO3 is no longer larger than the voltage on the negative input terminal thereof, the output thereof goes to zero, thus the resistive element R7 is shorted out by the comparator CO3. Thus the voltage divider network which originally comprised elements R6, R7, R10 and R13 now only has three resistive elements namely, R6, R10 and R13. This has a tendency to cause a step decrease at the positive input terminal of the comparator CO1 thus latching the output of the comparator CO1. This hysteresis loop effect prevents chattering. If for some reason the voltage v12 were to increase again to a safe level, the comparator CO1 would eventually be made positive at the output terminal thereof thus making the comparator CO2 positive at the output terminal thereof thus making the comparator CO3 positive at the output terminal thereof. If the output terminal of the comparator CO2 is made positive, the transistor Q1 is made conductive again and the undervoltage relay coil is energized again. A separate resetting action for circuit breaker CB must take place. At this time, the light emitting diode D5 will illuminate, but the light emitting diode D6 will not. This provides a positive indication that the circuit breaker CB had been tripped because of a previous undervoltage condition between the lines L1 and L2. In order to illuminate the light emitting diode D6, the pushbutton switch PBS must be pressed thus bringing in the control relay CR1 thus latching the latching contacts CR1a thereof.

It is to be understood with respect to the embodiments of the invention that they are not limited to three-phase operation. It is also to be understood that the apparatus may operate without the memory section associated with the diode D6 or the indicating section associated with the diode D5. It is also to be understood that the linkage arrangement associated with the circuit breaker CB is not limiting, but merely illustrative. It is also to be understood that the polarities of the elements may be uniformly reversed under certain circumstances.

The apparatus taught with respect to the embodiments of this invention have many advantages. One advantage lies in the fact that only one capacitive element need be used for both logic triggering and energy supply. Another advantage lies in the fact that a memory element may be provided to indicate to an operator that an undervoltage situation had previously occurred. Another advantage is associated with the fact that a light-emitting diode is utilized to show when the undervoltage relay is in an open state. Another advantage lies in the fact that the circuit is primarily solid state or static in nature thus eliminating problems associated with relays.

What we claim as our invention is:

1. Circuit breaker apparatus with undervoltage trip capability, comprising:
   (a) separable main contact means for protecting an electrical system;
   (b) capacitive voltage-sensing means interconnected at the input thereof with said electrical system for measuring the electrical system voltage, said voltage-sensing means having a pair of output terminals across which a voltage signal of predetermined minimum value exists when said electrical system voltage is of a predetermined or greater voltage value, said voltage signal remaining across said terminals for a first predetermined period of time which starts when said electrical system voltage falls below said predetermined value;
   (c) resistive means connected in circuit relationship with said pair of output terminals for providing a voltage level between resistive means output terminals, said voltage level being related to the magnitude of said voltage signal;
   (d) voltage comparator means having one set of input terminals thereof connected to receive said voltage level, another set of input terminals thereof having a relatively fixed voltage reference value impressed thereacross, the output of said voltage comparator means providing a deenergizing signal when the voltage on said one set of input terminals thereof is less than the voltage on said another set of terminals thereof, said latter event occurring after a second predetermined period of time which is shorter than said first predetermined period of time and which is initiated concurrent with the start of said first period of time;
   (e) controllable switch means having a control terminal thereof connected to the output of said voltage comparator means for being deenergized to a nonconducting state at the main terminals thereof whenever such deenergizing signal is present;
   (f) undervoltage relay means connected in circuit relationship with said main terminals of said controllable switch means for being controlled thereby, and connected in circuit relationship with said output terminals of said voltage sensing means for being empowered thereby during said second time period, said undervoltage relay means cooperating with said separable main contact means to cause such separable main contact means to open when said undervoltage relay means ceases to conduct, said undervoltage relay means ceasing to conduct when said controllable switch means is made nonconductive thus causing said separable main contacts to open at a time which occurs at the end of said second predetermined time period; and
   (g) resettable memory means connected in circuit relationship with said output of said voltage comparator means, said memory means providing a continuing indication of the presence of a prior undervoltage condition until reset.

2. Circuit breaker apparatus with undervoltage trip capability, comprising:
   (a) separable main contact means for protecting an electrical system;
   (b) capacitive voltage-sensing means interconnected at the input thereof with said electrical system for measuring the electrical system voltage, said voltage-sensing means having a pair of output terminals across which a voltage signal of predetermined minimum value exists when said electrical system voltage is of a predetermined or greater voltage value, said voltage signal remaining across said terminals for a first predetermined period of time which starts when said electrical system voltage falls below said predetermined value;
   (c) a voltage divider resistive means connected in circuit relationship with said pair of output terminals for providing a voltage level between resistive means output terminals, said voltage level being related to the magnitude of said voltage signal;
   (d) voltage comparator means having one set of input terminals thereof connected to receive said voltage level, another set of input terminals thereof having a relatively fixed voltage reference value impressed thereacross, the output of said voltage comparator means providing a deenergizing signal when the voltage on said one set of input terminals thereof is less than the voltage on said another set of terminals thereof, said latter event occurring after a second predetermined period of time which is shorter than said first predetermined period of time and which is initiated concurrent with the start of said first period of time;
   (e) controllable switch means having a control terminal thereof connected to the output of said voltage comparator means for being deenergized to a nonconducting state at the main terminals thereof whenever such deenergizing signal is present;
   (f) undervoltage relay means connected in circuit relationship with said main terminals of said controllable switch means for being controlled thereby, and connected in circuit relationship with said output terminals of said voltage sensing means for being empowered thereby during said second time period, said undervoltage relay means cooperating with said separable main contact means to cause such separable main contact means to open when said undervoltage relay means ceases to conduct, said undervoltage relay means ceasing to conduct when controllable switch means is made nonconductive thus causing said separable main contacts to open at a time which occurs at the end of said second predetermined time period;
   (g) resettable memory means connected in circuit relationship with said output of said voltage comparator means, said memory means providing a continuing indication of the presence of a prior undervoltage condition until reset; and
   (h) latching means interconnected at an input thereof to said output of said voltage comparator means and interconnected at an output thereof to an input of said voltage comparator means, the presence of said deenergizing signal being fed through said latching means to said input of said voltage comparator means to latch said comparator means after said deenergizing signal has been produced.

* * * * *